(12) United States Patent
Penner et al.

(10) Patent No.: US 9,384,523 B1
(45) Date of Patent: Jul. 5, 2016

(54) METHOD FOR REDUCING INPUT LATENCY ON GPU ACCELERATED DEVICES AND APPLICATIONS

(71) Applicant: Google Inc., Mountain View, CA (US)

(72) Inventors: Eric Scott Penner, San Francisco, CA (US); Simon Hatch, San Francisco, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 13/954,886

(22) Filed: Jul. 30, 2013

(51) Int. Cl.
*G06T 1/20* (2006.01)
(52) U.S. Cl.
CPC .......................................... *G06T 1/20* (2013.01)
(58) Field of Classification Search
None
See application file for complete search history.

(56) References Cited

U.S. PATENT DOCUMENTS

| | | | | |
|---|---|---|---|---|
| 5,861,893 | A  * | 1/1999 | Sturgess | 345/562 |
| 2009/0019448 | A1 * | 1/2009 | Bouge et al. | 718/104 |
| 2011/0028210 | A1 * | 2/2011 | Rubin et al. | 463/30 |
| 2013/0057563 | A1 * | 3/2013 | Persson | 345/522 |
| 2013/0271757 | A1 * | 10/2013 | Kang et al. | 356/300 |
| 2014/0130187 | A1 * | 5/2014 | Prashant et al. | 726/29 |

OTHER PUBLICATIONS

Gery, "GDI Overview," 1992, retrieved on Mar. 24, 2015 from https://msdn.microsoft.com/en-us/library/ms969913.aspx.*
"GPU Command Buffer," Mar. 2012, retrieved on Mar. 23, 2015 from http://www.chromium.org/developers/design-documents/gpu-command-buffer.*

* cited by examiner

*Primary Examiner* — Ryan D McCulley
(74) *Attorney, Agent, or Firm* — McDermott Will & Emery LLP

(57) ABSTRACT

The subject technology discloses configurations for receiving, by a first process, a set of input events from an application in which the set of input events includes a set of input update commands. The first process writes the set of input update commands into a low-latency graphics pipeline. The subject technology dispatches, by the first process, the set of input update commands from the low-latency graphics pipeline to a second process. The second process receives the set of input update commands from the low-latency graphics pipeline. The subject technology then writes, by the second process, a set of input data into a shared graphics processing unit (GPU) texture.

21 Claims, 5 Drawing Sheets

METHOD FOR REDUCING INPUT LATENCY ON GPU ACCELERATED DEVICES AND APPLICATIONS

BACKGROUND

The subject technology generally relates to graphics processing unit (GPU) hardware acceleration for improving application performance. For instance, there are efforts to find ways to more effectively utilize GPU hardware to achieve better performance or power savings.

SUMMARY

The subject technology provides for a computer-implemented method, the method including: receiving, by a first process, a set of input events from an application in which the set of input events includes a set of input update commands; writing, by the first process, the set of input update commands into a low-latency graphics pipeline; dispatching, by the first process, the set of input update commands from the low-latency graphics pipeline to a second process; receiving, by the second process, the set of input update commands from the low-latency graphics pipeline; and writing, by the second process, a set of input data into a shared graphics processing unit (GPU) texture.

Yet another aspect of the subject technology provides a system. The system includes one or more processors, and a memory including instructions stored therein, which when executed by the one or more processors, cause the processors to perform operations including: receiving, by a first process, a set of input events from an application in which the set of input events includes a set of input update commands; writing, by the first process, the set of input update commands into a low-latency graphics pipeline; dispatching, by the first process, the set of input update commands from the low-latency graphics pipeline to a second process; receiving, by the second process, the set of input update commands from the low-latency graphics pipeline; and writing, by the second process, a set of input data into a shared graphics processing unit (GPU) texture.

The subject technology further provides for a non-transitory machine-readable medium comprising instructions stored therein, which when executed by a machine, cause the machine to perform operations including: receiving, by a first process, a set of input events from an application in which the set of input events includes a set of input update commands; writing, by the first process, the set of input update commands into a low-latency graphics pipeline; dispatching, by the first process, the set of input update commands from the low-latency graphics pipeline to a second process; receiving, by the second process, the set of input update commands from the low-latency graphics pipeline; and writing, by the second process, a set of input data into a shared graphics processing unit (GPU) texture.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
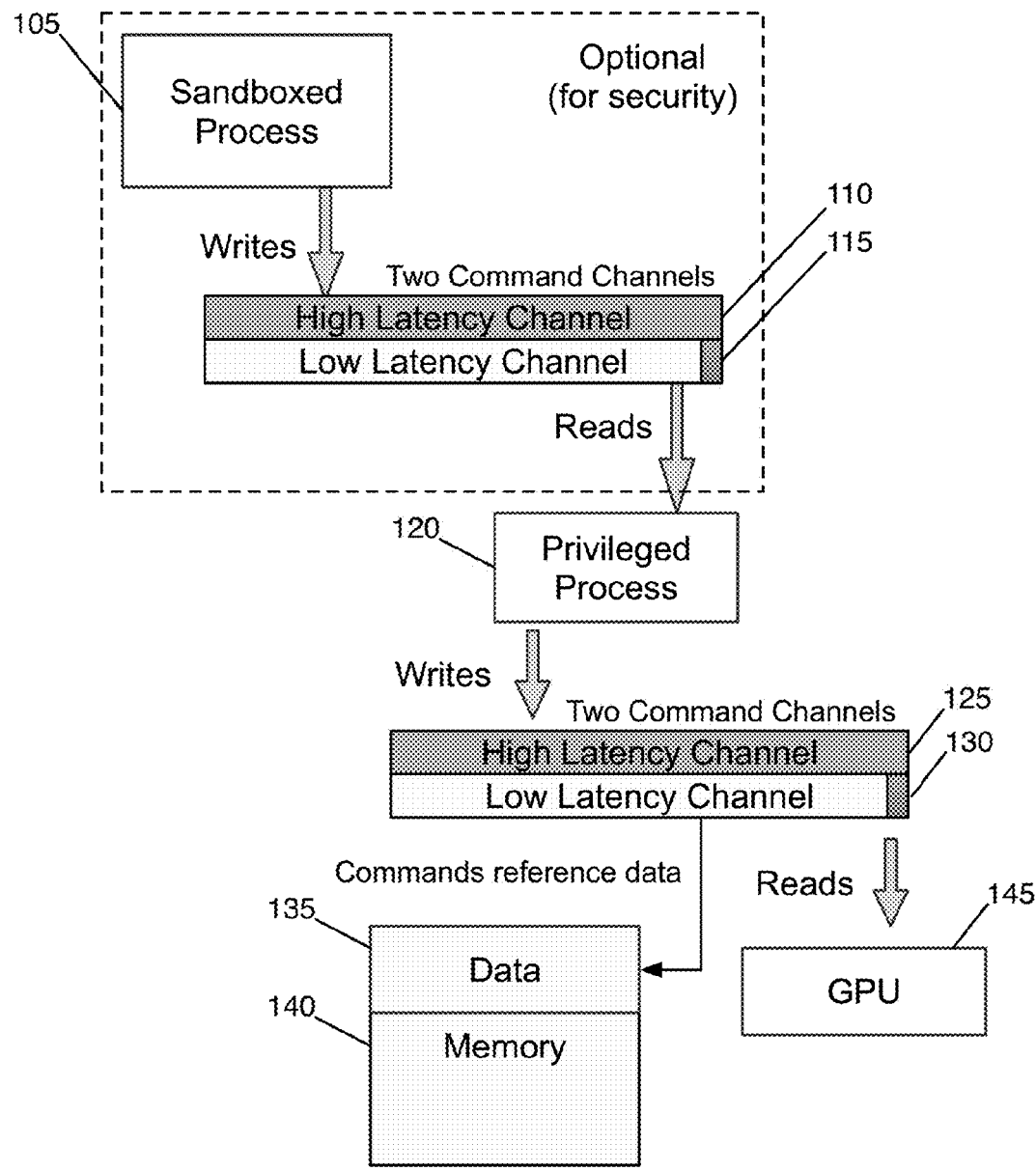
FIG. 1 conceptually illustrates an example computing architecture in which some configurations of the subject technology may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Graphics processing unit (GPU) hardware acceleration is a technique that may be used for increasing application performance (e.g., improving frame-rate which is the frequency at which unique consecutive images called 'frames' are produced). A GPU may be heavily pipelined that allows for achieving a high frame-rate (throughput), but often at the cost of higher input latency (e.g., the time taken for feedback from a user's action to become visible on screen). Latency may be measured in frames, and typical causes of additional frames of latency include double or triple buffering of output frames and multiple levels of command-buffering.

Command-buffers are used by GPU device drivers as well as within applications themselves to specify commands that will eventually execute on the GPU. Touch sensitive devices may be particularly sensitive to input latency since the user is physically touching the display and can readily see discrepancies between the user's real movement and the movement on screen. Thus, any small amount of saved latency during touch actions can result in an improvement in user experience.

The subject technology reduces latency for input events to take effect on the GPU as input dependant rendering commands (also referred to herein as 'input dependent commands'). In some implementations, input events are interpreted at the start of the application pipeline and then passed through the application's graphics pipeline and finally through the GPU's pipeline. This is because the commands that are generated for the GPU are heavily dependent on the inputs themselves. For example, if the user was dragging an object on a touch-sensitive screen, the application would receive the location of the user's finger in an input event, calculate new positions of one or more user interface objects in application code, and include the new positions into GPU commands themselves, which will eventually execute on the GPU to draw the object in a new location. In such implementations, the only choice to improve latency is to reduce the number of commands in high latency command buffers, decrease the time to dispatch those commands and execute them on the GPU, and to execute the pipeline steps serially (e.g., each pipeline step runs in order with no overlap) instead of in parallel.

The subject technology lowers input latency by not adding input dependent data to a high-latency GPU command buffer as input dependent commands. Instead, these input dependent commands are split into input data and non-input dependent commands that reference the latest input data. All input data is updated directly in the GPU's memory via a low-latency side-channel, thus reducing latency in for the input to reach the GPU. In one example, an application sends input update commands to the GPU via the low-latency side-channel, and the GPU processes drawing commands that reference that data through an indirection, and the GPU thus moves graphical objects in response to very recent user input. Since input dependent data is delivered in the low-latency side-channel, the GPU will have access to more recent input data than it would if the input had travelled through the regular high latency command buffer.

More specifically, the subject technology provides the following components to reduce input latency: 1) a first thread in a sandboxed process that receives input and dispatches commands to both a high-latency and low-latency channel; 2) a respective GPU thread which receives high latency drawing commands via the high-latency channel; 3) a shared GPU texture, which GPU drawing commands reference to receive recent input data; and 4) a respective "low-latency" GPU thread, which receives the input dependent data from the low-latency channel and writes it into the shared texture (which will be read by the GPU).

In some configurations, a GPU fence command(s) may be provided to more strictly enforce atomic access of the shared texture. For instance, the shared texture may not be accessed on the GPU until a fence command is completed. A GPU fence command, in one example, may inserted into a command channel and then be queried for a given condition (e.g., the completion of the fence command). Thus, the GPU fence command may be utilized as a mechanism for stalling a thread, or GPU command channel, that may access the shared texture until a set of commands are completed (e.g., committed to memory) before the GPU fence command itself is completed. Without utilizing a GPU fence, an atomic update of the input event data on the GPU may be implemented. In one example, an atomic update can be achieved by first updating the input data in one command, followed by an atomic 'toggle' command that modifies a single byte atomically, to signal that the input event update is complete.

In another example, 'streaming extensions' may be used to update the input texture atomically on the GPU. Such extensions may be provided by operating systems or drivers to update a streaming texture (such as video texture) to the latest frame. If this atomic frame update occurs on the GPU, this extension can be used as the low latency side-channel.

In yet another example, knowledge of GPU command execution times may be used to insure the GPU is not accessing the shared texture when the shared texture GPU memory is updated asynchronously. For example, GPUs may stall execution after receiving too many frames of commands from the CPU. If the first command in each frame copies the input data out of the shared texture, that command will occur at a predictable time and updates can be timed to avoid it. Similarly, a fence can be inserted just after the input data is copied, and the CPU can wait for before updating GPU memory.

By applying certain user inputs directly on the GPU, rather than in the process of generating GPU commands on the CPU, several layers of pipelining can be skipped and lower input latency can be achieved. Since applications may buffer their own commands in a similar manner as the GPU (e.g., in a sandboxed environment), these CPU pipeline layers can also be skipped. In an application such as a web browser on a mobile operating system, the total saved input latency could be as much as 4 frames (e.g., 64 ms), and the result would be better input latency than a native mobile OS application, even though a given web browser may utilize a deeper pipeline that spans several sand-boxed processes.

In some implementations, the subject technology provides configurations including a method and system for rendering graphics in a computing system. The computing system may be, for example, a personal computer (PC), a laptop, a video game console, a mobile phone or device, a tablet computing device, a phablet, a television, a personal digital assistant (PDA), and/or another electronic computing device. The graphics may be rendered by executing commands from one or more graphics pipelines. In one example, one or more commands from the graphics pipeline(s) may be executed using a graphics-processing unit (GPU) of the computing system. An image corresponding to executed commands may then be displayed on a display screen of the computing system.

FIG. 1 conceptually illustrates an example computing architecture 100 in which some configurations of the subject technology may be implemented. For instance, the example shown in FIG. 1 illustrates a path for storing input data into a shared GPU texture in GPU memory. In one example, the computing architecture 100 may be implemented by a computing device (e.g., mobile device) or system.

As illustrated in the example of FIG. 1, a sandboxed process 105 may execute in a restricted environment (e.g., a "sandbox") that restricts access to a set of resources, including memory, disk, OS libraries or APIs, in order to provide additional security to an operating system or application (e.g., web browser). Alternatively, in some implementations, a process that does not run within a sandbox may be provided instead.

The sandboxed process 105 may issue commands for pipelining (e.g., by writing) into a high latency channel 110 or a low latency channel 115, each of which may represent a shared memory or buffer that pipelines commands between the sandboxed process 105 and one or more other processes. The low and high latency channels 115 and 100 may be implemented as respective First In, First Out (FIFO) queues for buffering commands. In one example, the low latency channel 115 has a lower latency metric in comparison with a latency metric of the high latency channel. Latency, for instance, may be measured in terms of a period of time in which a command remains in a respective channel before being dispatched from the channel or accessed (e.g., read) by another process. The sandboxed process therefore may write input update commands into the low latency channel 115, and write non-input dependent rendering commands into the high latency channel 110 in some implementations.

For improving the latency of processing input update commands, the sandboxed process 105 writes one or more commands into the low latency channel 115. Subsequently, the sandboxed process 105 may dispatch commands from the low latency channel 115 to a privileged process 120. The privileged process 120, which may have more access to system resources than the sandboxed process 105, may receive the dispatched commands from the low latency channel 115 and subsequently write the commands into a second low latency channel 130. In one example, the privileged process 120 may have access to one or more APIs that may directly communicate with the GPU or GPU memory. As further shown, non-input dependent rendering commands from the high latency channel 110 may be dispatched by the sandboxed process 105. The privileged process 120 may receive the dispatched non-input dependent rendering commands from the high latency channel 110 and write the commands into a second high latency channel 125. In some implementations, the privileged process 120 may convert received commands, via the low latency channel 115 or high latency channel 110, into calls to standard graphics API libraries including OpenGL or Direct3D.

As further shown, the input update commands from the second low latency channel 130 may write, by the privileged process 120, directly into a GPU memory 140 as data 135. In one example, the non-input dependent rendering commands may reference up-to-date input data stored in GPU memory 140. The data 135 may represent a shared texture stored in the GPU memory 140. A GPU 145 may read the data 135 from the GPU memory 140. Additionally, the GPU 145 may read non-input dependent rendering commands from the second high latency channel 125. In one example, the GPU 145 is a secondary processor (e.g., apart from a CPU of a given computing system and designed to work conjunctively with the CPU) configured to accelerate rendering of images for output to a display.

Figure 2:
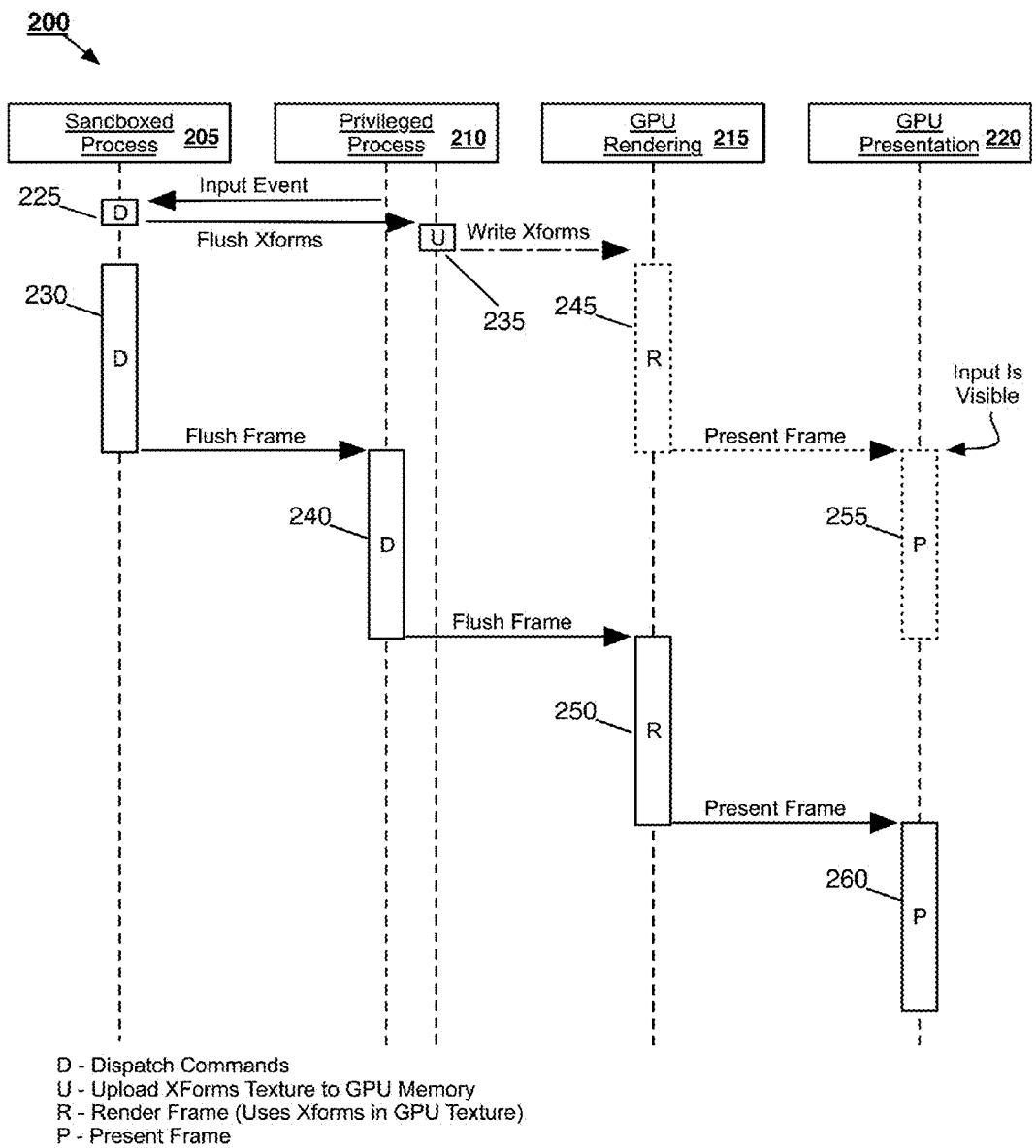
FIG. 2 conceptually illustrates an example timing diagram in different stages for processing graphics commands.

FIG. 2 conceptually illustrates an example timing diagram 200 in different stages for processing graphics commands. In particular, FIG. 2 illustrates an example in which graphics commands are written into low and high latency channels for reading by a GPU of a given computing system.

In a first stage corresponding to a sandboxed process 205, an input event(s) including input event data (e.g., input dependent and/or non-input dependent command(s)) is passed from a privileged process 210 to the sandboxed process 205 for writing into a low latency channel 225. Examples of an input event may include a user input (e.g., touch input, keyboard input, mouse input, voice input, eye input, etc.) for manipulating and interacting with a one or more various graphical elements included in a given graphical user interface provided by an application. In this example, it is assumed that the input event may not be received directly in the sandboxed process 205 (e.g., due to restrictions to one or more resources), so any input event is forwarded from the privileged process 210. The sandboxed process 205 may represent a first thread in some configurations.

After receiving data included in the input event, the sandboxed process 205 may then perform any "input transformations" that may be required, such that the input event data is in a form that is ready to be written to a GPU's memory, and then write the transformed input event data (denoted as "Xforms" in FIG. 2) into the low latency channel 225. An input transformation may include applying a physics formula or other mathematical operation (e.g., matrix calculation) to the input event data before sending the final transformation(s) to the GPU. In one example, this input transformation may be a partial transformation of the input event data. The data written to the low latency channel 225 may include input update commands as described in FIG. 1. As further shown, the sandboxed process 205 may write non-input dependent rendering commands into a high latency channel 230 (e.g., as described in FIG. 1).

In another example, the sandboxed process 205 may receive input events directly (e.g., without requiring the privileged process 210 to forward input events). In this example, the sandboxed process may have additional access privileges to resources, such as access to one or more APIs that allow for writing directly to GPU memory. Thus, in this example, the sandboxed process 205 may write input events (and any data included with the input events) directly into GPU memory and forgo writing input update commands into a low latency channel.

In a second stage corresponding to the privileged process 210, data (e.g., input dependent commands) from the low latency channel 225 may be dispatched by the sandboxed process 205 and received by a first GPU thread of the privileged process 210 (indicated as "Flush Xforms" in FIG. 2). The first thread of the privileged process 210 may write the dispatched data from the low latency channel 225 to a second low latency channel 235. In addition, data (e.g., non-input dependent rendering commands) from the high latency channel 230 may be dispatched by the sandboxed process 205 and then received by a second thread of the privileged process 210 (indicated as "Flush Frame" in FIG. 2). The second thread of privileged process 210 may then write the dispatched data received from the high latency channel 230 to a second high latency channel 240. Although the example illustrates that the privileged process 210 includes two separate threads, in some example, the privileged process 210 may utilize a single thread for performing the operations described in the second stage.

In a third stage corresponding to a GPU rendering stage 215, a separate GPU thread may read the input update commands from the second low latency channel 235 and subsequently write the input data into GPU memory as a shared texture (indicated as "Write Xforms" in FIG. 2). The GPU may execute a set of rendering or drawing commands 245 that accesses the shared texture in GPU memory. In one example, the GPU may utilize a vertex shader that accesses the input data via the shared texture in GPU memory. The vertex shader can be understood as a specialized hardware component (e.g., part of the GPU) that transforms data in GPU memory to move pixels on a display screen. In the example where a user provides user input moving an object on the display screen, the vertex shader may move the rendered pixels corresponding to the object from a first position to a second position on the display screen based on the user input. Also shown, a second separate GPU thread 250 may also read data from the second high latency channel 240 (indicated as "Flush Frame" in FIG. 2) and subsequently execute a second set of rendering commands 250 based on the data from the second high latency channel 240.

In a fourth stage corresponding to a GPU presentation stage 220, the GPU may provide the results of the executed rendering commands 245 (based on the shared texture from GPU memory) for presentation on a display as a presentation frame data 255. Further, the GPU may provide the results of the executed rendering commands 250 for presentation on the display as a presentation frame data 260. In the fourth stage, the input is now visible on the display screen to the user.

Figure 3:
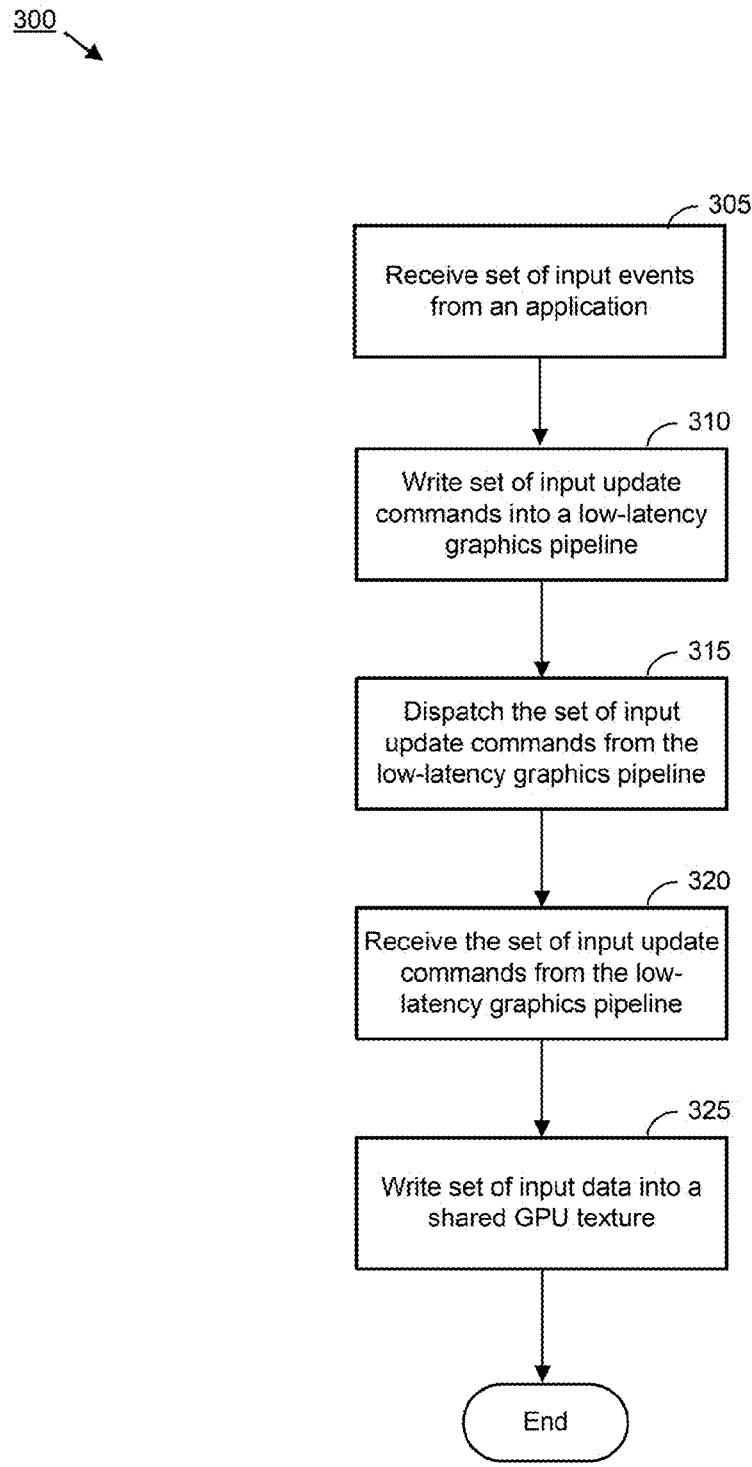
FIG. 3 conceptually illustrates an exemplary process for writing input data into a shared GPU texture.

FIG. 3 conceptually illustrates an exemplary process 300 for writing input data into a shared GPU texture. The process 300 can be performed on one or more computing devices or systems in some configurations.

The process 300 begins at 305 by receiving, by a first process, a set of input events from an application. The set of input events includes a set of input update commands in some configurations. In one example, the set of input events includes input received from a user for interacting with a graphical user interface. The first process comprises a sandboxed process in one example. For instance, the input dependent commands include input updates received from a user for interacting with a graphical user interface in one example. The process 300 at 310 writes, by the first process, the set of input update commands into a low-latency graphics pipeline.

The process 300 at 315 dispatches, by the first process, the set of input update commands from the low-latency graphics pipeline to a second process. The second process is a privileged process in one example. Dispatching, by the first process, the set of input update commands from the low-latency graphics pipeline to the second process may include transforming the set of input update commands (e.g., by performing a mathematical operation, etc.) in one example. Further, transforming the set of input update commands may include a partial transformation of the set of input update commands.

The process 300 at 320 receives, by the second process, the set of input update commands from the low-latency graphics pipeline. The process 300 at 325 writes, by the second process, a set of input data into a shared graphics processing unit (GPU) texture. The shared GPU texture is stored in GPU memory in one example. In some configurations, writing the set of input data into the shared GPU texture is performed by a separate GPU thread or a separate CPU thread. The process 300 then ends.

Figure 4:
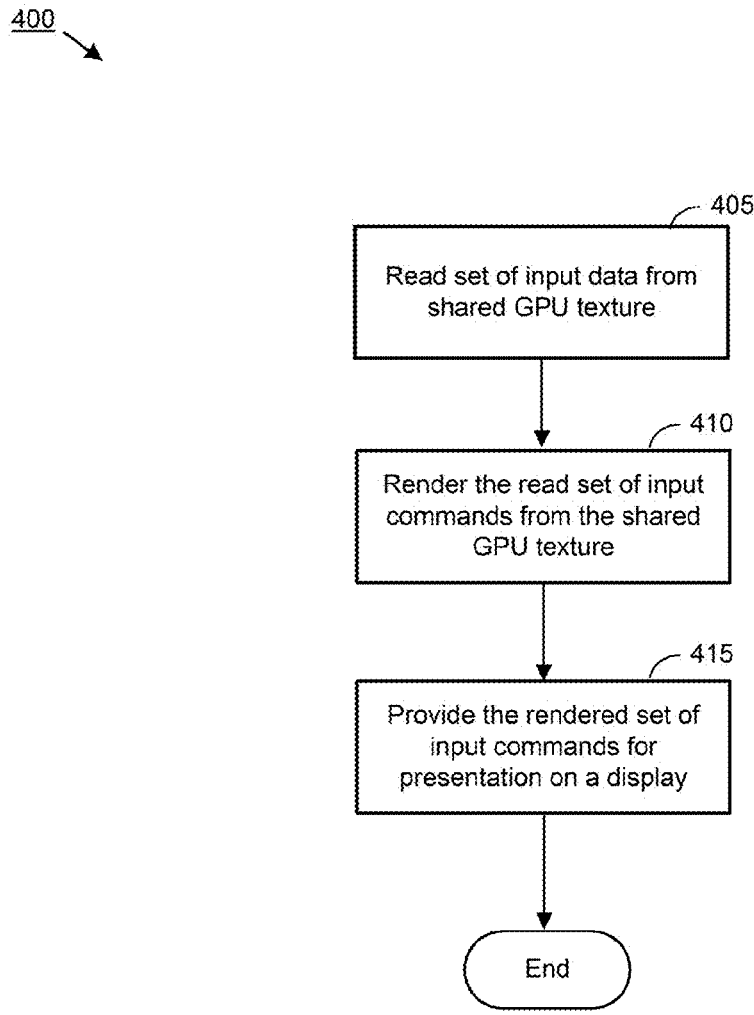
FIG. 4 conceptually illustrates an exemplary process for accessing a set of input data from a shared GPU texture.

FIG. 4 conceptually illustrates an exemplary process 400 for accessing a set of input data from a shared GPU texture. The process 400 can be performed on one or more computing devices or systems in some configurations.

The process 400 begins at 405 by reading, by a separate GPU thread, the set of input data from the shared GPU texture. In some configurations, the separate GPU thread executes a set of non-input-dependent rendering commands that reference the set of input data from the shared GPU texture. In some configurations, a GPU fence command(s) may be provided to enforce access of the shared texture to ensure the integrity of the data in the shared GPU texture. For instance, the shared texture may not be accessed by the process 400 until a fence command is completed. Without utilizing a GPU fence, an atomic update of the input event data on the GPU may be implemented. In one example, an atomic update can be achieved by first updating the input data in one command, followed by an atomic 'toggle' command that modifies a single byte atomically, to signal that the input event update is complete. In this example, the process 400 may detect the presence of the single byte that indicates that the input event update is completed, and then access the input data from the shared GPU texture. In another example, 'streaming extensions' may be used to update the input texture atomically on the GPU. Such extensions may be provided by a given operating system or drivers to update a streaming texture (e.g., a video texture) to the latest frame.

The process 400 at 410 renders, by the separate GPU thread, the set of non-input-dependent rendering commands that reference the set of input data from the shared GPU texture. In one example, rendering using updated input data may be accomplished utilizing a vertex shader that accesses the shared GPU texture. At 415, the process 400 provides, by the separate GPU thread, the rendered set of non-input-dependent rendering commands for presentation on a display. For instance, the GPU may provide the rendered set of non-input-dependent rendering commands in a visible form on the display. The process 400 then ends.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of non-transitory machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 5:
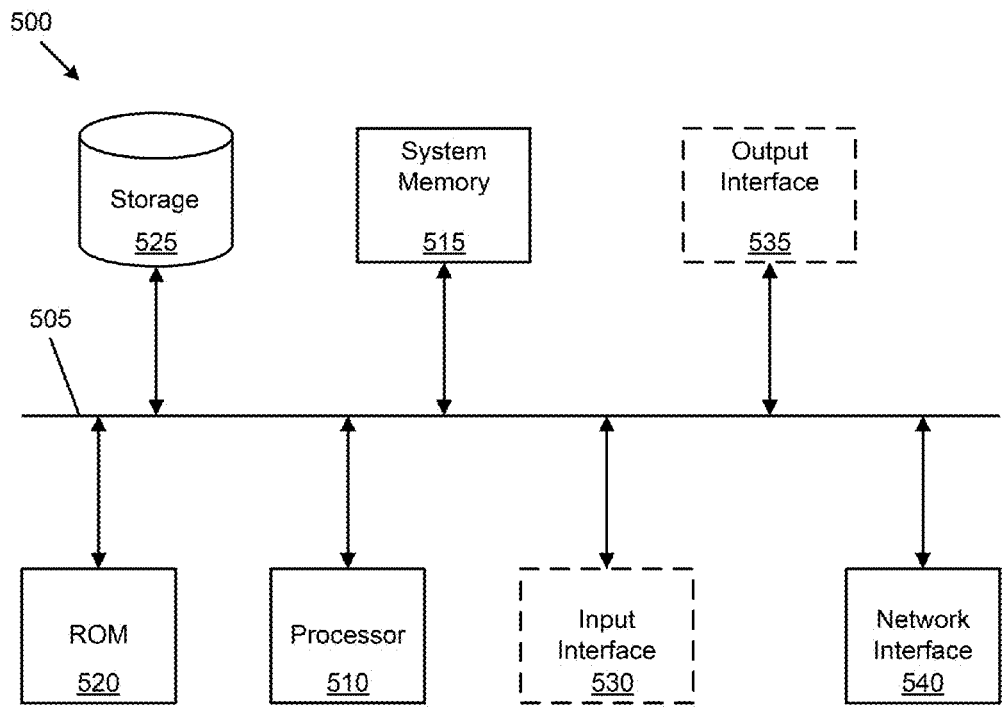
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or another sort of electronic device. In some configurations, the system 500 includes a television with one or more processors embedded therein. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. The components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to non-transitory, tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
    receiving, by a first process, a set of input events associated with user input;
    separating input dependent commands associated with the set of input events into a set of input update commands for writing a set of data into a shared graphics processing unit (GPU) texture and a set of rendering commands that reference data in the shared GPU texture;
    writing, by the first process, the set of input update commands into a first low-latency first-in-first-out (FIFO) graphics pipeline;
    writing, by the first process, the rendering commands into a first high-latency FIFO graphics pipeline, the first low-latency FIFO graphics pipeline having a lower latency metric in comparison with a latency metric of the first high-latency FIFO graphics pipeline;
    dispatching, by the first process, the set of input update commands from the first low-latency FIFO graphics pipeline to a second process;
    receiving, by the second process, the set of input update commands from the first low-latency FIFO graphics pipeline; and
    writing, by the second process via a second low-latency FIFO graphics pipeline, the set of data into the shared GPU texture.

2. The method of claim 1, further comprising:
    receiving, by the first process, the set of rendering commands from an application;
    dispatching, by the first process, the set of rendering commands from the first high-latency FIFO graphics pipeline to the second process;
    receiving, by the second process, the set of rendering commands from the first high-latency FIFO graphics pipeline; and
    providing, by the second process via a second high-latency FIFO graphics pipeline, the set of rendering commands to the GPU.

3. The method of claim 1, wherein the shared GPU texture is stored in GPU memory.

4. The method of claim 1, wherein the first process comprises a sandboxed process.

5. The method of claim 1, wherein the second process comprises a privileged process.

6. The method of claim 1, wherein writing the set of data into the shared GPU texture is performed by a separate GPU thread or a separate CPU thread.

7. The method of claim 1, wherein the set of input events comprises input received from a user for interacting with a graphical user interface.

8. The method of claim 1, wherein dispatching, by the first process, the set of input update commands from the first low-latency FIFO graphics pipeline to the second process comprises:
    transforming the set of input update commands into the set of data for processing by the GPU.

9. The method of claim 8, wherein transforming the set of input update commands comprises a partial transformation.

10. The method of claim 1, further comprising:
reading, by a separate GPU thread, the set of data from the shared GPU texture, wherein the separate GPU thread executes the set of rendering commands that reference the set of data from the shared GPU texture;
rendering, by the separate GPU thread, the set of rendering commands that reference the set of data from the shared GPU texture; and
providing, by the separate GPU thread, the rendered set of rendering commands for presentation on a display, wherein the rendered set of rendering commands are visible on the display.

11. A system, the system comprising:
one or more processors;
a memory comprising instructions stored therein, which when executed by the one or more processors, cause the processors to perform operations comprising:
receiving, by a first process, a set of input events associated with user input;
separating input dependent commands associated with the set of input events into a set of input update commands for writing a set of data into a shared graphics processing unit (GPU) texture and a set of rendering commands that reference data in the shared GPU texture;
writing, by the first process, the set of input update commands into a first low-latency first-in-first-out (FIFO) graphics pipeline;
writing, by the first process, the rendering commands into a first high-latency FIFO graphics pipeline, the first low-latency FIFO graphics pipeline having a lower latency metric in comparison with a latency metric of the first high-latency FIFO graphic pipeline;
dispatching, by the first process, the set of input update commands from the first low-latency FIFO graphics pipeline to a second process;
receiving, by the second process, the set of input update commands from the first low-latency FIFO graphics pipeline; and
writing, by the second process via a second low-latency FIFO graphics pipeline, the set of data to the shared GPU texture.

12. The system of claim 11, wherein the memory further comprises instructions stored therein, which when executed by the one or more processors, cause the processors to perform operations further comprising:
receiving, by the first process, the set of rendering commands from an application;
dispatching, by the first process, the set of rendering commands from the first high-latency FIFO graphics pipeline to the second process;
receiving, by the second process, the set of rendering commands from the first high-latency FIFO graphics pipeline; and
providing, by the second process via a second high-latency FIFO graphics pipeline, the set of rendering commands to the GPU.

13. The system of claim 11, wherein the shared GPU texture is stored in GPU memory.

14. The system of claim 11, wherein the first process comprises a sandboxed process.

15. The system of claim 11, wherein the second process comprises a privileged process.

16. The system of claim 11, wherein writing the set of data into the shared GPU texture is performed by a separate GPU thread or a separate CPU thread.

17. The system of claim 11, wherein the set of input events comprises input received from a user for interacting with a graphical user interface.

18. The system of claim 11, wherein dispatching, by the first process, the set of input commands from the first low-latency FIFO graphics pipeline to the second process comprises:
transforming the set of input update commands into the set of data for processing by the GPU.

19. The system of claim 18, wherein transforming the set of input update commands comprises a partial transformation.

20. The system of claim 11, wherein the memory further comprises instructions stored therein, which when executed by the one or more processors, cause the processors to perform operations further comprising:
reading, by a separate GPU thread, the set of data from the shared GPU texture, wherein the separate GPU thread executes the set of rendering commands that reference the set of data from the shared GPU texture;
rendering, by the separate GPU thread, the set of rendering commands that reference the set of data from the shared GPU texture; and
providing, by the separate GPU thread, the rendered set of rendering commands for presentation on a display, wherein the rendered set of rendering commands are visible on the display.

21. A non-transitory machine-readable medium comprising instructions stored therein, which when executed by a machine, cause the machine to perform operations comprising:
receiving, by a first process, a set of input events associated with user input;
separating input dependent commands associated with the set of input events into a set of input update commands for writing a set of data into a shared graphics processing unit (GPU) texture and a set of rendering commands that reference data in the shared GPU texture;
providing, by the first process, the set of input update commands to a first low-latency first-in-first-out (FIFO) graphics pipeline;
providing, by the first process, the rendering commands to a first high-latency FIFO graphics pipeline, the first low-latency FIFO graphics pipeline having a lower latency metric in comparison with a latency metric of the first high-latency FIFO graphic pipeline;
providing the set of input update commands from the first low-latency FIFO graphics pipeline to a second process;
providing the set of rendering commands from the first high-latency FIFO graphics pipeline to the second process;
providing, by the second process via a second low-latency FIFO graphics pipeline, the set of data to the shared GPU texture; and
providing, by the second process via a second high-latency FIFO graphics pipeline, the set of rendering commands to the GPU.

* * * * *